Feb. 16, 1971 W. D. WORRELL 3,564,366
MOTOR CONTROL SYSTEM FOR A DIRECT CURRENT TRACTION MOTOR
Filed July 2, 1969 5 Sheets-Sheet 1

INVENTOR.
William D. Worrell
BY
C. L. Meland
ATTORNEY

Fig. 4

INVENTOR.
William D. Worrell
BY
C. L. Meland
ATTORNEY

INVENTOR.
William D. Worrell
BY
C. L. Meland
ATTORNEY

United States Patent Office 3,564,366
Patented Feb. 16, 1971

3,564,366
MOTOR CONTROL SYSTEM FOR A DIRECT CURRENT TRACTION MOTOR
William D. Worrell, Anderson, Ind., assignor to General Motors Corporation, Detroit, Mich., a corporation of Delaware
Filed July 2, 1969, Ser. No. 838,508
Int. Cl. H02p 7/28
U.S. Cl. 318—257        11 Claims

ABSTRACT OF THE DISCLOSURE

A motor power supply system for a direct current traction motor which is utilized to propel a motor vehicle. The traction motor and a source of direct current are connected by a switching device which takes the form of a silicon controlled rectifier. The "on" and "off" times of the controlled rectifier are programmed such that the "on" time is controlled as a function of motor speed and increases as motor speed increases. The "off" time for the controlled rectifier is controlled as a function of the setting of an accelerator pedal for controlling the vehicle and as the accelerator pedal is depressed the "off" time of the controlled rectifier decreases. The system, in addition to the control circuit that has been described, includes a torque limit circuit, a speed limit circuit, a fault sensing circuit and an arrangement for preventing the vehicle from being shifted from a forward condition of movement to a reverse condition of movement or vice versa whenever the propulsion motor has a speed which is higher than a predetermined value.

---

This invention relates to motor control systems for direct current motors and more particularly to a motor control system that is utilized to propel an electrically powered vehicle.

It is known in the art of electrically powered vehicles and in the art of motor control systems to connect a switching device between a source of direct current and a direct current motor and then control the switching device to control the average voltage applied to the motor. In one type of system the "on" time of the switching device is maintained constant while the frequency of occurrence of repetitive "on" times is varied to vary the voltage applied to the motor. This is commonly referred to as pulse frequency control. Another type of control which is known is what is termed as pulse width control. During pulse width control the frequency of the voltage pulses is held constant but the pulse width is varied to thereby vary the voltage applied to the motor.

In operating a direct current propulsion motor for a motor vehicle from a source of direct current the counter EMF of the motor increases with motor speed. When the motor and vehicle are at rest the counter EMF is substantially zero and when a switching device connects the source of direct current and the motor, the full voltage of the source of direct current is applied to the motor. The motor current is now only limited by the inductance of the circuit and resistance of the circuit. This means that when the motor is at rest (no counter EMF), it is desirable to have a very short "on" time for the switching device in order not to exceed the current rating of the switching device connecting the source of direct current and the motor and so as not to exceed the current rating of the other components in the series circuit.

On the other hand, as the motor is accelerated the counter EMF of the motor increases with the result that it is desirable to maintain the switching device on for longer periods of time in order to furnish sufficient voltage to the motor.

It is accordingly one of the objects of this invention to provide a motor power supply system for an electrically powered vehicle where the "on" and "off" times of a controlled rectifier which connects the battery and the motor are programmed both as a function of motor speed and accelerator pedal setting and wherein this programming is modified when certain conditions of operation are sensed. In carrying this object forward, the "on" time of the controlled rectifier or switching device which connects the motor and source of power is increased as motor speed increases. At the same time the "off" time or the time between conducting periods of the controlled rectifier is controlled as a function of accelerator pedal setting and the system is arranged such that as the accelerator is further depressed the "off" time of the switching device is decreased. The "off" time is further controlled in response to certain limiting conditions of operation of the system.

It will be appreciated from the foregoing that motor control system of this invention is a system wherein the "on" and "off" times are programmed to provide optimum power supply to the traction motor under all operating speeds of the motor and vehicle. Thus, when the vehicle and motor are at rest the system is arranged such that the "off" time is at a maximum whereas the "on" time is at a minimum. The "on" time of the controlled rectifier is increased as vehicle speed increases while the "off" time of the controlled rectifier is decreased as the accelerator pedal is further depressed. In addition the "off" time of the system is controlled as a function of certain conditions of operation of the system.

Another object of this invention is to provide a power supply system for an electrically powered vehicle of the type that has been described which includes a torque limit system. This torque limit system operates such that the "off" time of the switching device connecting the source of direct current and the electric motor is increased for a given motor speed to prevent a predetermined value of motor current and torque from being exceeded.

A further object of this invention is to provide a motor power supply system for an electrically powered vehicle of the type that has been described where a speed limit system is provided which operates to limit the speed of the motor when a predetermined speed is reached. This speed limit circuit is arranged such that the "off" time of the switching device connecting the motor and the source of direct current is increased to prevent the motor from exceeding a predetermined speed when such speed is attained.

Still another object of this invention is to provide a motor power supply system for an electrically powered vehicle which includes a fault sensing circuit which is operative to sense the voltage across the switching device that connects the source of direct current and the motor. The fault sensing circuit is arranged such that if the switching device connecting the motor and source of direct current does not turn off within a predetermined period of time for a given motor speed the circuit operates to open the main power supply circuit. In addition, the fault sensing circuit can be utilized to control a signal device such as an indicating light which when turned on indicates a fault in the system.

Still another object of this invention is to provide a motor power supply system for an electrically powered vehicle which includes an interlock circuit that prevents the vehicle from being switched from a forward to a reverse mode of operation or vice versa unless the motor is rotating at some speed below a predetermined speed or is stopped.

Figure 1:
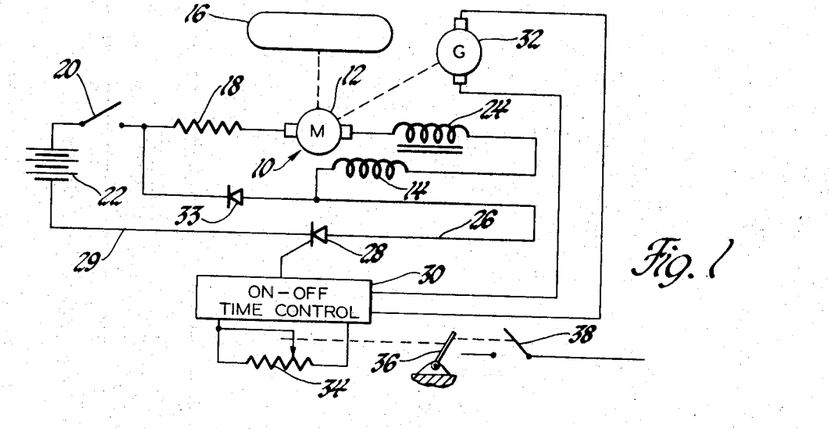
FIG. 1 is a schematic circuit diagram of a motor power supply system made in accordance with this invention.

Referring now to the drawings and more particularly to FIG. 1, the reference numeral 10 designates a direct current series commutator type of electric propulsion motor which has a series field 14 and an armature 12. The armature 12 is mechanically connected to a wheel 16 of a motor vehicle it being understood that this armature can be mechanically connected with one or more wheels as desired for propelling the vehicle. The armature 12 is connected in series with a motor shunt 18 which is shown as a resistor which has a very small resistance as is well known to those skilled in the art. The shunt 18 is connected in series with a master control switch 20 which in turn is connected in series with a source of direct current which is shown as a battery and which is designated by reference numeral 22. Although the source of direct current can take a wide variety of forms it preferably takes the form of a plurality of series-connected storage batteries as is more fully described hereinafter.

The other side of the amature 12 of the motor is connected in series with a choke or inductor 24 which is utilized to limit the rise of current in the main power supply circuit when the motor and source of direct current are initially connected. The inductor 24 is connected in series with the field 14 of the motor and the field is connected with a conductor 26 which in turn is connected with a switching device 28. The switching device 28 takes the form of a silicon controlled rectifier having an anode connected with line 26 and a cathode connected with line 29 which leads to the negative side of the source of direct current 22. The controlled rectifier 28 has a gate connected with a control circuit which has been generally designated by reference numeral 30. The control circuit will be completely described hereinafter and is shown in FIG. 1 as connected with a tachometer generator 32 and a variable resistor or potentiometer 34. The shiftable part of the potentiometer 34 is mechanically coupled to an accelerator pedal 36 which is also mechanically connected to a switch 38 the purpose of which will be more fully described hereinafter.

The tachometer generator 32 is mechanically coupled to the armature 12 of the motor 10 and therefore rotates at a speed which is a function of motor speed and also vehicle speed. The tachometer generator 32 develops an output voltage that is a function of the speed of rotation of motor 10 and may be an alternating current generator which has an output voltage that is a function of input speed. The tachometer generator 32 as will be more fully described hereinafter is connected with a bridge rectifier which rectifies its alternating current input to a direct current signal which is a function of the speed of rotation of the motor 10. A diode 33 is connected across field 14, inductor 24, armature 12 and shunt 18.

In FIG. 1, the "on-off" time control designated by reference numeral 30 is shown connected with both the tachometer generator 32 and the potentiometer 34. The "on-off" control 30 controls the "on and off" time periods of the controlled rectifier 28 to therefore control the average voltage applied to the motor. The on-off control 30 is described in detail hereinafter but as an aid in better understanding this invention the curves of FIG. 2 have been provided to illustrate the on and off times of the controlled rectifier 28 which are controlled both as a function of the setting of the accelerator pedal 36 and the output speed of the motor 10.

Figure 2:
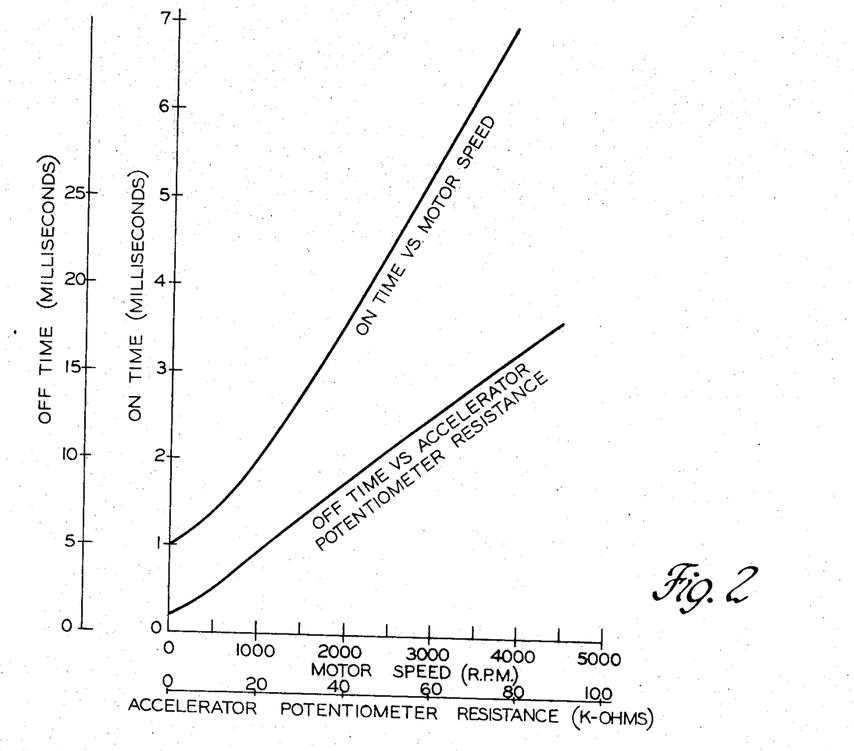
FIG. 2 illustrates in graphical form the "on" and "off" times of the silicon controlled rectifier connecting the source of direct current and electric motor of FIG. 1 controlled as a function of the accelerator pedal setting and motor speed.

Referring now more particularly to FIG. 2 it is seen that one of the curves plots on time of the controlled rectifier 28 as a function of motor speed. It is seen that at zero speed of the motor or at a rest condition of the motor the one time of the controlled rectifier 28 is programmed at approximately one millisecond and that as motor speed increases the on time of the controlled rectifier 28 increases.

The lower curve of FIG. 2 is a plot of accelerator potentiometer resistance versus off time of the controlled rectifier 28. It can be seen from an inspection of FIG. 2 that the off time of the controlled rectifier 28 increases as potentiometer resistance increases. The accelerator pedal 36 and the potentiometer 34 are so mechanically connected that when the accelerator pedal is fully depressed the resistance of the potentiometer is at its lowest value resulting in the smallest off time for the controlled rectifier 28 as will be more fully described hereinafter. When the accelerator pedal is full up, or in other words, when it is not being depressed the potentiometer resistance is at a maximum resulting in a maximum off time for the controlled rectifier 28 as will also be more fully described hereinafter. It can be appreciated from an inspection of FIGS. 1 and 2 that the off time of the controlled rectifier 28 is controlled in response to the position of the accelerator pedal 36, this off time decreasing as the accelerator pedal is depressed. On the other hand, the on time of the controlled rectifier 28 is a function of drive motor speed and this on time increases as motor speed increases.

Figure 3:
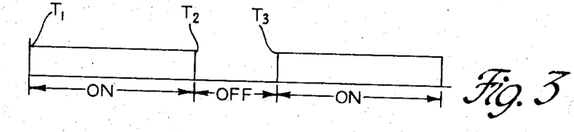
FIG. 3 is a graphical representation of the "on" and "off" times of the switching device connecting the electric motor and the source of direct current during a given condition of operation shown in FIG. 2.

FIG. 3 illustrates a particular mode of operation where the on time for controlled rectifier 28 is approximately twice the duration of the off time. This could correspond to some mode of operation on the curves of FIG. 2 where the on time is approximately twice the off time. As an example when the potentiometer has an effective resistance of approximately 10K ohms, the off time for the controlled rectifier 28 is 2.5 milliseconds and if the motor is at this time operating at slightly less than 3,000 r.p.m., the on time for the controlled rectifier will be 5 milliseconds. This would correspond to the condtion shown in FIG. 3 where the on time ($T_1$ to $T_2$) for the controlled rectifier 28 is substantially twice the duration of the off time ($T_2$ to $T_3$).

It will, of course, be appreciated that the on and off times will vary in accordance with the curves shown in FIG. 2 and therefore vary as a function of instantaneous drive motor speed and accelerator pedal position.

Figure 4:
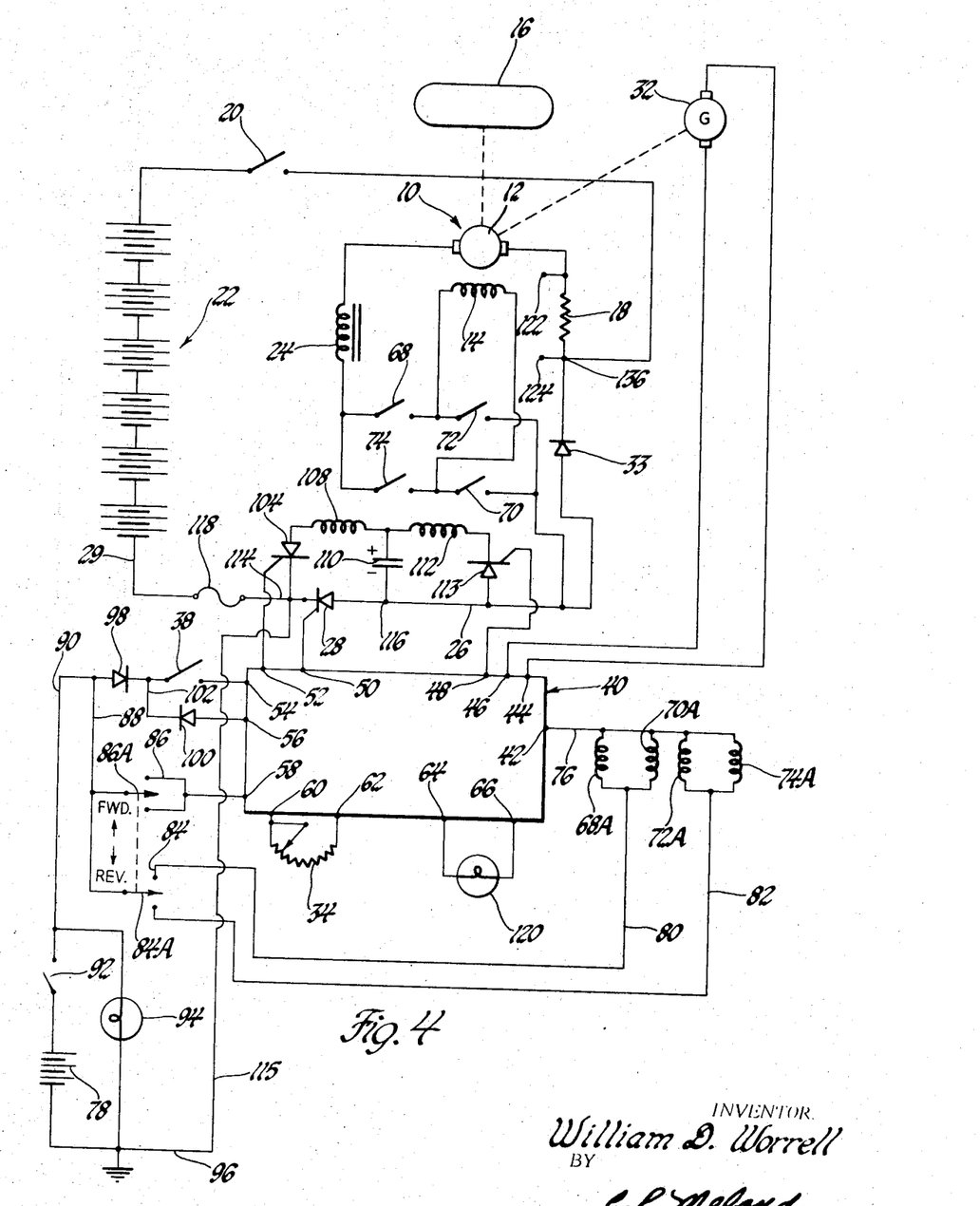
FIG. 4 is a schematic circuit diagram of a power supply system similar to that shown in FIG. 1, but illustrating in greater detail the components which make up the motor power supply system of this invention.

Referring now more particularly to FIG. 4 a more detailed schematic diagram is illustrated for the motor power supply system of this invention. In FIG. 4, the same reference numerals have been used as were used to identify the same parts as those illustrated in FIG. 1. The on-off time control in FIG. 4 is embodied in a block which is generally designated by reference numeral 40 and the contral circuits represented by the block 40 are shown and will be described in detail hereinafter.

In FIG. 4, the direct current power source 22 is represented by six 12-volt storage batteries which are connected in series to provide 72 volts for the system. It is to be understood, however, that the number of batteries can be varied and the system may include, for example, seven 12-volt batteries providing a source of voltage of 84 volts.

The control block 40 is intended to represent control circuits which are more fully described hereinafter and the block 40 has terminals designated by reference numerals 42 through 66. These same reference numerals are used to identify the same junctions in the other figures of the drawings to be described hereinafter. It is seen from an inspection of FIG. 4 that the junctions 44 and 46 are connected with the tachometer generator 32 and, therefore, will have an alternating current applied thereto which is a function of the speed of rotation of the armature 12 of motor 10.

The motor control system shown in FIG. 4 includes control switches for controlling the direction of movement of the motor vehicle, that is, whether or not the armature 12 rotates in a direction to provide forward movement of the vehicle or in an opposite direction to provide reverse movement of the vehicle. The direction switches 68 and 70 when closed connect the motor to the source of direct current to provide a forward movement for the vehicle. The switches 68 and 70 are relay controlled switches and are controlled by the relay coils 68A and 70A. When the direction switches 72 and 74 are closed and the direction switches 68 and 70 open, the direction of rotation of the motor 12 is reversed and the vehicle will now move in reverse. The switches 70 and 72 are relay control contacts and are controlled by the energization of relay coils 72A and 74A shown in FIG. 4. It is seen from FIG. 4 that the relay coils 68A through 74A are all connected to a conductor 76 and this conductor is connected with the junction 42 of control block 40. The junction 42, as will be more fully described hereinafter, is at timse connected to the negative side of an accessory battery designated by reference numeral 78. The accessory battery 78 can be used to energize certain accessories on the motor vehicle. It is also used to energize some of the control circuits including the relay coils for the forward and reverse switches of the electrical system.

It is seen from FIG. 4 that relay coils 68A and 70A are commonly connected with a conductor 80 whereas relay coils 72A and 74A are commonly connected to a conductor 82. The conductor 80 is connected to one fixed contact of a manually operable switch 84 while the conductor 82 is connected to the other fixed contact of this switch. The switch 84 has a movable contact 84A which is ganged to the movable contact 86A of another switch designated by reference numeral 86. The fixed contacts of switch 86 are connected with junction 58 while the movable contacts 84A and 86A of switches 84 and 86 are connected with a conductor 88.

The movable contacts 86A and 84A as pointed out are ganged together and can be moved by a suitable manually operable device which is set by the operator of the motor vehicle to provide forward or reverse movement for the vehicle. As indicated on FIG. 4, when the contacts 86A and 84A are moved up the motor is connected to the source of direct current to provide forward movement for the vehicle. On the other hand, when the contacts 86A and 84A are moved down the vehicle is switched to provide reverse movement. The conductor 88 is connected with a power supply conductor 90 which in turn is connected with a switch 92. The switch 92 preferably is controlled by an ignition lock and may, therefore, be termed a key switch. The switch 92 is connected in series with the positive side of the accessory battery 78, the negative side of this battery being grounded as shown. A signal lamp 94 is connected in series with switch 92 and this signal lamp is energized whenever the key switch 92 is closed.

It will be appreciated from the foregoing that the relay coils 68A, 70A, 72A, and 74A will be energized depending upon the position of switches 84 and 86 and depending upon whether or not the junction 42 is in effect connected to grounded conductor 96. The connection of junction 42 to ground will be described hereinafter.

The system of FIG. 4 includes the switch 38 which is shown in FIG. 1 and which as previously indcated is operated by the accelerator pedal 36. The movable contact of switch 38 is connected with conductor 90 through a diode 98 while the fixed contact of this switch is connected with junction 54 on block 40. The mechanical connection between the accelerator pedal 36 and the switch 38 is such that this switch is closed whenever the accelerator pedal is in its full up position. As soon as the accelerator pedal 36 is depressed by the operator of the vehicle the switch 38 is opened and remains open as long as the accelerator pedal is depressed to some extent. A diode 100 is connected between junction 56 and the conductor 102 as is seen in FIG. 4.

In addition to the controlled rectifier 28 the motor power supply system of this invention has two other controlled rectifiers 104 and 113 which operate to control the conduction of controlled rectifier 28. The controlled rectifier 104 is connected in series with an inductor 108 and with a capacitor 110. One end of the capacitor is connected with an inductor 112 and this inductor is connected to the cathode of a controlled rectifier 113. It is seen from FIG. 4 that the cathode of controlled rectifier 104 is connected with a conductor 114 and is therefore connected to the cathode of controlled rectifier 28. The conductor 114 is connected to conductor 96 by a lead 115. The capacitor 110 is connected to conductor 26 at junction 116. The anode of controlled rectifier 113 is connected with conductor 26 and it is seen that a fuse 118 is connected between conductor 29 and conductor 114. The gates of controlled rectifiers 113, 28 and 104 are connected respectively with junctions 48, 50 and 52 of control block 40 and these connections will be more fully described hereinafter.

Without going into detail as to the triggering of the controlled rectifiers at the present time it is pointed out that the controlled rectifier 104 is what might be termed a shut-off controlled rectifier since when it is gated conductive it causes the controlled rectifier 28 to be turned off. The controlled rectifier 113 may be termed a turn-around controlled rectifier since it operates to provide a circuit for charging the capacitor 110 to the polarity shown in FIG. 4 during certain conditions of operation. It will be appreciated that when the capacitor 110 is charged to the polarity shown in FIG. 4 that the turning on of controlled rectifier 104 will provide a path for the discharger of capacitor 110 through the anode-cathode circuit of controlled rectifier 104 and through the inductor 108. This will raise the potential of the cathode of controlled rectifier 28 to a higher value than its anode with the result that controlled rectifier 28 is turned off. The control system as will be more fully described hereinafter operates to turn on controlled rectifier 113 at the same time that controlled rectifier 28 is turned on.

When the controlled rectifier 104 is gated on to turn off controlled rectifier 28 the capacitor 110 will discharge and then charge through the conductive controlled rectifier 104 to a polarity opposite to that shown in FIG. 4. When controlled rectifiers 28 and 113 are now simultaneously turned on the controlled rectifier 113 will provide a path for charging capacitor 110 to the polarity shown in FIG. 4 through inductor 112. The capacitor is then charged to the proper polarity for reverse biasing controlled rectifier 28 whenever controlled rectifier 104 is gated conductive.

It can be seen from FIG. 4 that the junctions 64 and 66 of the block 40 are connected with a signal lamp 120 and this signal lamp is a fault indicator lamp which will be energized whenever a fault condition exists in the system. The junctions 60 and 62 are connected with the potentiometer 34 that is controlled by the accelerator pedal. The shunt 18 is connected with junctions 122 and 124 and these junctions as will be more fully described hereinafter operate to apply voltage to a control system which is utilized in the torque limiting part of the system.

Figure 5:
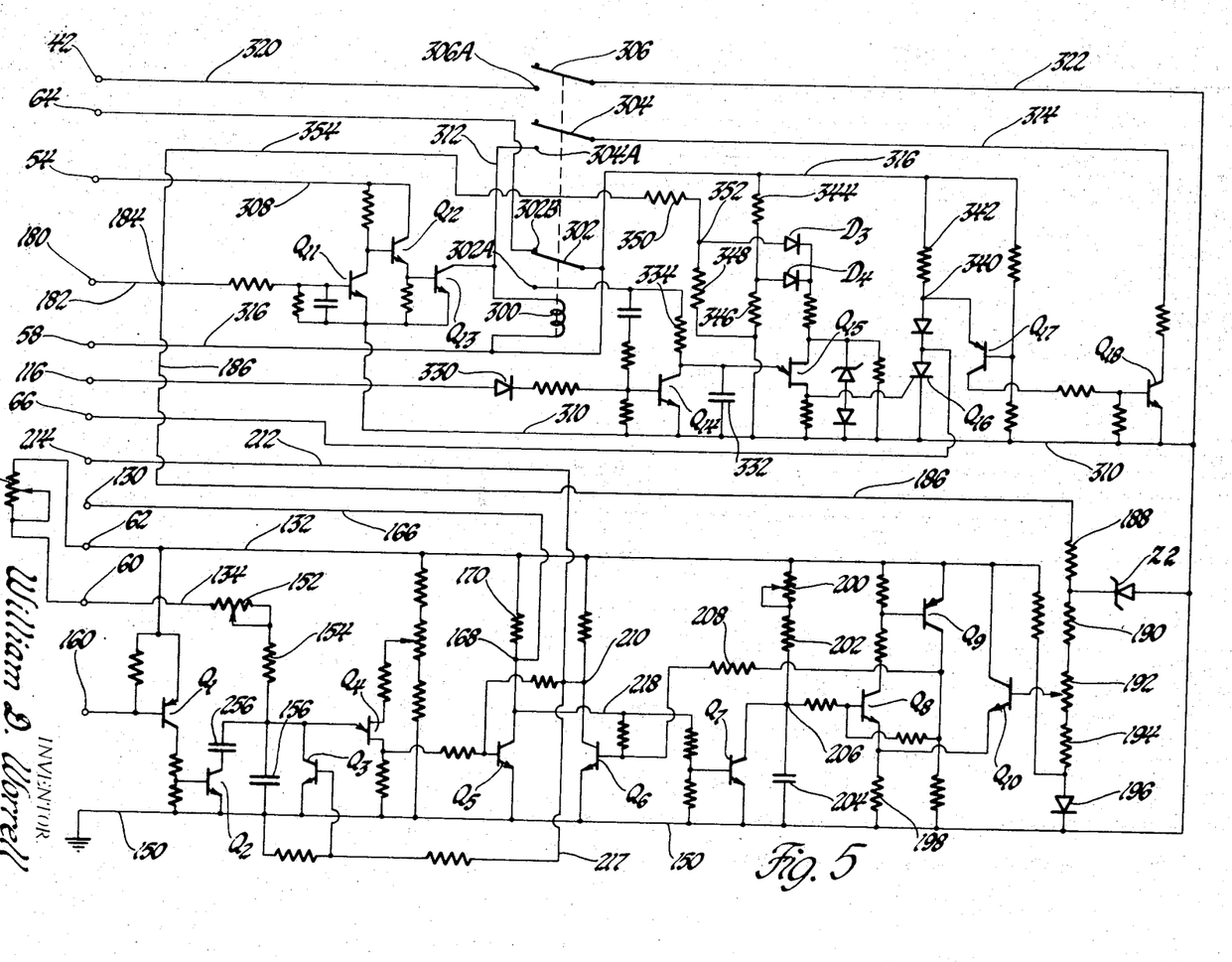
FIG. 5 is a schematic circuit diagram of a part of the control system illustrated generally in FIG. 4.

Referring now more particularly to FIG. 5 additional components of the motor control system of this invention will now be described. In FIG. 5, the junctions or terminals which are illustrated have been designated by the same reference numerals as those used in the other figures of the drawings and junctions identified by the same reference numeral are electrically connected in the system. For example, the junctions 60 and 62 shown in FIG. 5 are connected with the potentiometer resistor 34. As another example, there is a junction 116 shown in FIG. 4 connected with the anode of controlled rectifier 28 and a junction shown in FIG. 5 identified by the same reference numeral. This indicates that these two junctions are electrically connected in the total electrical system and it is therefore understood in the description to be made hereinafter the junctions with like reference numerals are electrically connected.

Figure 7:
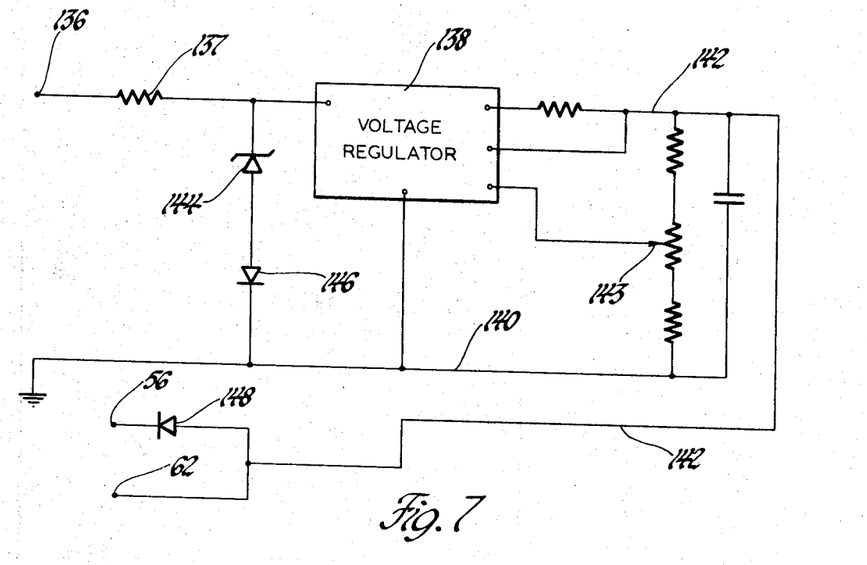
FIG. 7 is a schematic circuit diagram of a regulated power supply which forms a component part of the motor control system made in accordance with this invention.

Referring now more particularly to FIG. 5 it is seen that the potentiometer resistor 34 is connected across conductors 132 and 134. The conductor 132 has a regulated positive direct current potential applied to it from a power supply shown in FIG. 7 connected to junction 62. This power supply (FIG. 7) has a grounded input conductor as shown and has another input conductor or junction designated by reference numeral 136. The junction 136 is connected to the positive side of the power source 22 (see FIG. 4) so that a positive direct potential of 72 volts is applied to junction 136. The power supply includes the components shown in FIG. 7, including a voltage regulator designated by reference numeral 138. The voltage regulator 138 is shown in block diagram form and in practice may be a model 802 voltage regulator manufactured by the Beckman Instruments Company. The output voltage of the voltage regulator 138 is applied between the grounded conductor 140 and the conductor 142. This output voltage can be regulated by adjusting the potentiometer 143 and the system is arranged such that a direct voltage of approximately fourteen volts is maintained between conductors 142 and 140. The resistor 137, Zener diode 144 and diode 146, shown in FIG. 7, operate to reduce the input voltage to the regulator 138 to approximately 18 volts.

It is seen that the conductor 142 is connected with junction 62 and therefore applies a positive direct voltage to line 132 shown in FIG. 5. The conductor 142 is also connected in series with a diode 148 the opposite end of the diode being connected with junction 56 which is likewise illustrated in FIG. 4. It therefore will be appreciated that a regulated potential of fourteen volts is applied to conductor 102 of FIG. 4 from the voltage regulator shown in FIG. 7 when it is in operation. This positive voltage will then be applied to junction 54 shown in FIGS. 4 and 5 whenever the switch 38 is closed.

Referring now to FIG. 5, it can be seen that a regulated potential of approximately fourteen volts will be applied between the conductor 132 and a grounded power supply conductor 150. It will also be appreciated that the potentiometer resistor 34 is connected in series with resistors 152 and 154 and a capacitor 156 across the power supply conductors. The circuit that has just been described has a predetermined RC time constant and this circuit, together with transistors Q1 through Q10 shown on the lower portion of FIG. 5, form the on and off control circuit for the controlled rectifier 28 in a manner which will now be described.

Figure 6:
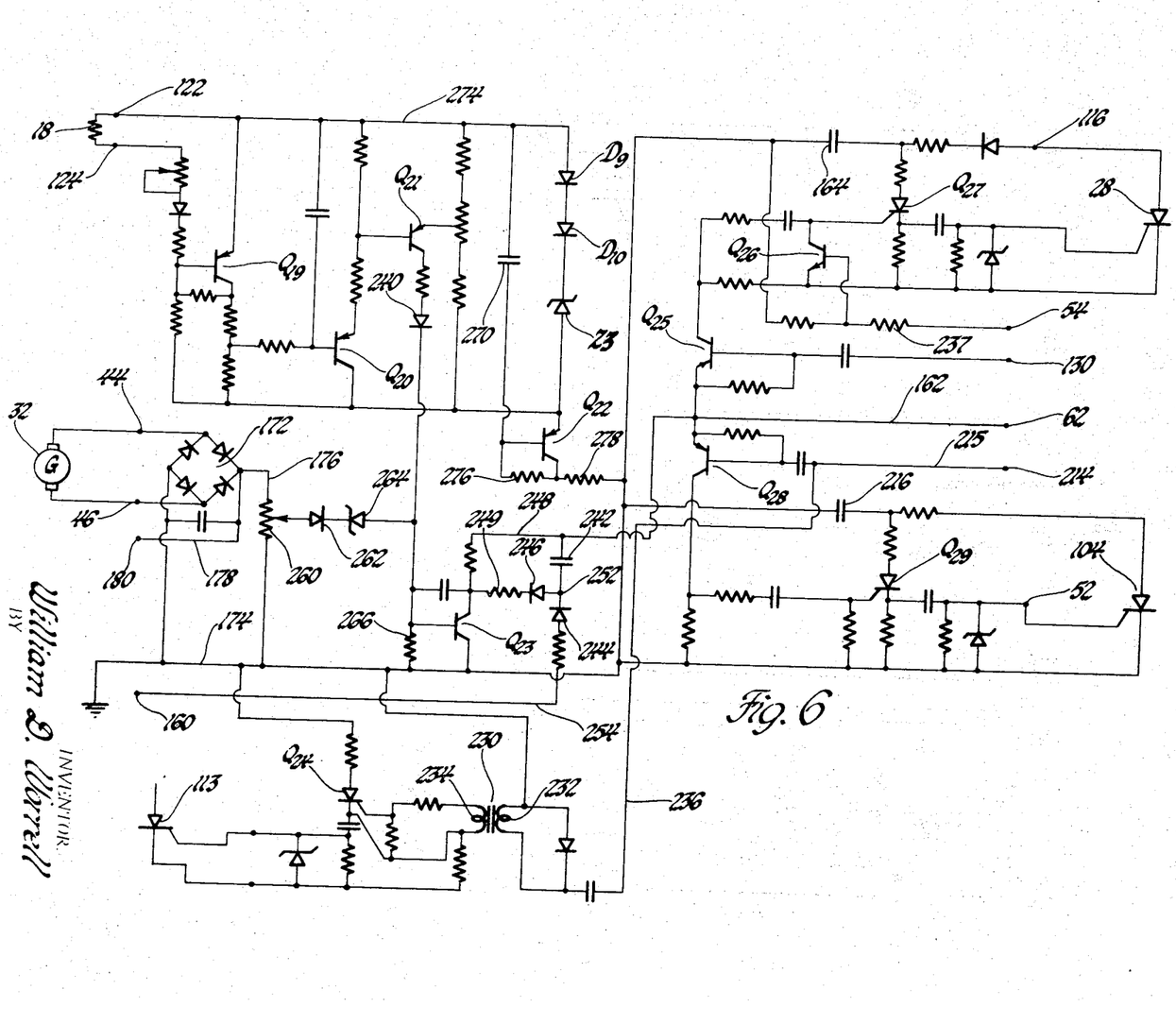
FIG. 6 is a schematic circuit diagram of a portion of the control system illustrated generally in FIG. 4.

The transistors Q1 and Q2 as shown in FIG. 5 are part of the torque limit control which will be described hereinafter. It is pointed out however that the base of transistor Q1 is connected with a junction 160 which is also illustrated in FIG. 6. In addition, it is pointed out that the junction 130 shown in FIG. 5 is connected with the junction 130 shown in FIG. 6 and the voltage at this junction controls the firing of the controlled rectifier 28. To pursue this further, it is seen in FIG. 6 that the junction 130 is connected with the base of a transistor Q25. The transistor Q25 is connected with a gate of a controlled rectifier Q27 and when transistor Q25 is turned on, a positive potential from positive conductor 162 will be applied to the gate of controlled rectifier Q27 to bias this controlled rectifier on. When controlled rectifier Q27 turns on the capacitor 164, shown on FIG. 6, will discharge through controlled rectifier Q27 and into the gate-cathode circuit of controlled rectifier 28 to turn this controlled rectifier on. The capacitor 164 was previously charged from junction 116 to the positive voltage appearing on the anode of the main power control rectifier 28.

It can be seen from an inspection of FIGS. 5 and 6 that the base of transistor Q25 is connected with the conductor 166 shown in FIG. 5 which in turn is connected with a junction 168 located between a resistor 170 and the collector of transistor Q5. The potential of junction 168 is used to control the firing of controlled rectifier 28 and when the transistor Q5 is biased conductive the potential of junction 168 and therefore the potential of the base of transistor Q25 shown in FIG. 6 drops to a value sufficient to cause the transistor Q25 to conduct and therefore cause the controlled rectifier 28 to be biased conductive. The signal that is applied to controlled rectifier 28 at this point in time represents the beginning of an on time pulse for the controlled rectifier 28 as will be readily apparent to those skilled in the art.

Referring to FIG. 5, the transistor Q4 is a unijunction transistor and this transistor will be biased conductive whenever the potential across capacitor 156 reaches a predetermined value. It will also be appreciated that whenever transistor Q4 conducts it biases transistor Q5 to a conductive condition with the result that controlled rectifier 28 is biased conductive. This means that the point in time that the controlled rectifier is biased conductive will be determined by the RC time constant of the circuit including the potentiometer resistor 34, resistors 152 and 154 and the capacitance of capacitor 156. As previously pointed out, the resistance of potentiometer resistor 34 varies with accelerator pedal position the resistor having a maximum resistance when the accelerator pedal is all the way up and having a minimum resistance when the accelerator pedal is fully depressed. As will become more readily apparent hereinafter, the RC time constant of the circuit that has just been described including capacitor 156 determines the off time of the controlled rectifier 28 since the controlled rectifier 28 will be gated conductive a predetermined time after capacitor 156 begins to charge and the charge rate of this capacitor is determined by the accelerator potentiometer 34. Therefore, with the accelerator all the way up and the potentiometer resistor 34 at a maximum value, the off time of the controlled rectifier 28 will be at a maximum as is evident from an inspection of FIG. 2.

Once the controlled rectifier 28 is turned on by a firing of the unijunction transistor Q4 it will be turned off at a predetermined time following its being gated to a conductive condition and this time, as previously described, is dependent upon the speed of rotation of the armature 12 of the drive motor. The circuit for accomplishing this function includes the tachometer generator 32 which develops an alternating voltage the amplitude of which is a function of armature speed of motor 10. The voltage developed by the tachometer generator 32 is applied to the terminals 46 and 44 shown in FIG. 4 and in FIG. 6. It is seen from an inspection of FIG. 6 that the voltage at terminals 44 and 46 is applied to the AC input terminals of a bridge rectifier designated by reference numeral 172. The direct current output terminals of bridge rectifier 172 are connected respectively with a grounded conductor 174 and with conductor 176. In addition, one of the direct current output terminals of bridge rectifier 172 is connected with a conductor 178 which in turn is connected to junction 180. The junction 180 is also illustrated in FIG. 5 and it is seen that this junction is connected with the conductor 182 of FIG. 5. The conductor 182 is connected with a junction 184 and this junction which has a positive potential that is a function of drive motor speed is applied to a conductor 186. The conductor 186 is connected to one side of a voltage divider comprised of resistors 188, 190, 192, and 194 and a diode 196. It is seen that the resistor 192 is a variable resistor having a tap connected with the base of transistor Q10. Because of this biasing arrangement the voltage developed across the resistor 198 which is connected with the emitter of transistor Q10, will be a function of the voltage developed by the tachometer generator 32 and therefore a function of the speed of rotation of the armature 12 of the drive motor 10.

The transistor Q10 together with transistors Q8 and Q9 form a circuit which determines the on time of the controlled rectifier 28. As previously pointed out, a voltage is developed across resistor 198 which is a function of drive motor speed. In this regard, it will be apparent from an inspection of FIG. 5 that the resistors 200 and 202 together with capacitor 204 form another RC circuit having a time constant which in part determines the time at which the transistor Q8 will be biased conductive. In this regard, the base of transistor of Q8 is connected to junction 206 on the RC circuit and the capacitor 204 charges through this RC circuit. When the voltage at junction 206 reaches a predetermined value with respect to the voltage that is being developed across resistor 198 the transistor Q8 will be biased conductive. When transistor Q8 is biased conductive it provides a base circuit for transistor Q9 with the result that transistor Q9 is biased conductive. When transistor Q9 is biased conductive, a voltage is fed to the base of transistor Q6 through the resistor 208. This is the collector voltage of conducting transistor Q9 and when this voltage is applied to the base of transistor Q6, the transistor Q6 is biased conductive. When transistor Q6 becomes biased conductive, the potential of junction 210 connected with the collector of transistor Q6 and likewise the potential of conductor 212, which is connected with junction 210, approaches the ground potential of conductor 150. The conductor 212 as shown in FIG. 5 is connected with a junction 214 shown in FIGS. 5 and 6. The junction 214 as shown in FIG. 6 is coupled to the base of transistor Q28 which has its emitter connected to the emitter of transistor Q25 and to conductor 162. The collector of transistor Q28 is connected to the gate of a controlled rectifier Q29. The anode of controlled rectifier Q29 is connected with a capacitor 216. When the voltage at junction 214 decreases, the transistor Q28 is biased conductive which applies a forward bias to the controlled rectifier Q29 switching this controlled rectifier on. When controlled rectifier Q29 switches on, it provides a circuit for discharging capacitor 216 into the gate of controlled rectifier 104 through the junction 52. When controlled rectifier 104 turns on, it provides a discharge path for capacitor 110 shown in FIG. 4 which discharges the capacitor through a circuit that reverse biases the controlled rectifier 28 to therefore turn off the controlled rectifier 28. It, therefore, is seen with reference to FIGS. 5 and 6, that whenever transistor Q6 is biased conductive due to the charging of capacitor 204 and the other interconnected transistors the controlled rectifier 28 is switched off.

It will be appreciated from an inspection of FIG. 5 that the transistors Q5 and Q6 form a bistable multivibrator, stable in either state and switch from one state to the other. Therefore, whenever transistor Q6 is turned on, transistor Q5 is turned off and vice versa.

The transistors Q3 and Q7 are utilized to prevent respectively conduction of transistors Q4 or Q8 during times when one of the capacitors 156 or 204 is charging to therefore time the beginning of a timing cycle for these capacitors. In this regard it will be appreciated that when Q5 turns on, which causes controlled rectifier 28 to turn on, the transistor Q6 is biased nonconductive. With transistor Q6 biased nonconductive, the potential of junction 210 goes to a positive value and this potential is applied to the base of transistor Q3 through a circuit that includes a conductor 217. This biases transistor Q3 conductive which short-circuits the capacitor 156 and prevents it from charging during this condition of operation.

The time that transistor Q3 will be conductive is the time T1 through T2, shown in FIG. 3, or in other words, the time that the controlled rectifier 28 is biased conductive. In a like manner it is seen that the base of transistor Q7 is coupled to the junction 168 through a circuit that includes the conductor 218. Therefore, when transistor Q5 is biased nonconductive, a voltage is applied to transistor Q7 to bias transistor Q7 on and, therefore, short-circuit and prevent the charging of capacitor 204. This occurs during the period T2 through T3 illustrated on FIG. 3.

It therefore will be appreciated that the point in time when capacitors 204 and 156 begin to charge are determined and arranged so that they control respectively the on and off times for the controlled rectifier 28. Thus, during the period T1 through T2 the charging of capacitor 204 determines the on time period of controlled rectifier 28 and as explained before this is a function of the motor speed voltage developed across resistor 198. On the other hand, the off time period between T2 and T3 shown in FIG. 3 is determined by the charge rate of capacitor 156, and this time is determined by the setting of the potentiometer resistor 34 mechanically coupled to the accelerator pedal of the vehicle. It will also be clear that the respective capacitors are prevented from beginning their charge cycle by the operation of transistors Q5 and Q6 in conjunction with transistors Q3 and Q7 which periodically short-circuit the capacitors.

The diode 196 connected in series with the voltage dividers provides a pre-bias for the speed signal applied thereto. If this diode were not present, the speed would have to rise to a sufficient level to get the base of transistor Q10 up to at least a predetermined voltage before any signal could be noticed in the emitter of transistor Q8. With this pre-bias arrangement, the voltage speed signal fed into the on time control circuit that has been described will start essentially at zero speed of the motor.

This Zener diode Z2 shown in FIG. 5 limits the maximum on time of controlled rectifier 28 to approximately 7 milliseconds to provide for smooth operation in the speed limiting control of the vehicle.

When transistor Q5 is biased conductive to in turn apply a forward bias to controlled rectifier 28, the so-called turn-around controlled rectifier 113 is biased conductive at the same time. This is accomplished by the circuit shown in FIG. 6 including the transformer 230 having a primary winding 232 and the secondary winding 234. It is seen that one side of the primary winding is connected with conductor 215 via a conductor 236. When controlled rectifier 28 is turned on by the circuit including transistor Q25, the voltage of conductor 215 will be at its higher level and will, therefore, apply a signal to the primary 232 which causes a signal to be developed in the secondary 234 of transformer 230. This signal developed in the secondary 234 is applied across the gate and cathode of a controlled rectifier Q24. It is seen from FIG. 6 that the anode-cathode circuit of controlled rectifier Q24 is coupled to the gate circuit of the turn-around controlled rectifier 113. Therefore, when a voltage is developed in the secondary 234 of transformer 230, the controlled rectifier 113 is gated conductive.

Referring now again to FIG. 6, it is seen that the gate firing circuit for controlled rectifier 28 includes the controlled rectifier Q27. It is also seen that an NPN transistor Q26 has its collector-emitter circuit connected across the gate and cathode of controlled rectifier Q27. The base of transistor Q26 is connected to junction 54 through a resistor 237. It will be recalled that junction 54, see FIG. 4, is connected with the switch 38 which in turn is controlled by the position of the accelerator pedal 36. When the accelerator pedal is up, the switch 38 is closed applying a voltage to the base-emitter circuit of transistor Q26 which turns this transistor on. When transistor Q26 turns on in its collector-emitter circuit, it shunts all gate signals from the controlled rectifier Q27 and therefore prevents the controlled rectifier 28 from turning on. This means that the controlled rectifier 28 can never be turned on when the accelerator pedal is in its full up position, that is, when switch 38 is closed.

This circuit, however, does not prevent the controlled rectifier 104 from firing which ensures that the commutating capacitor 110 will be sufficiently charged to turn off the controlled rectifier 28 when such a mode of operation is desired.

The motor control system of this invention includes a torque limit circuit which will now be described. This torque limit circuit responds to the voltage developed across the shunt 18, this shunt being connected with junctions 122 and 124 shown in FIGS. 4 and 6. The torque limit circuit includes a transistor Q19, shown in FIG. 6, which is normally biased to a conductive condition. It will be appreciated from an inspection of FIG. 6 that as the current flowing through the shunt 18 increases the voltage of the base of transistor Q19 goes more positive and, therefore, tends to bias transistor Q19 toward a nonconductive condition. If transistor Q19 is turned off, it changes the voltage applied to the base of transistor Q20. The conduction of transistor 20 controls the conduction of transistor Q21. If the current through the shunt 18 increases to a predetermined level, the transistor Q21 will be biased conductive and it is seen that its collector is connected with the base of transistor Q23 through a diode 240.

It is seen in FIG. 6 that the transistor Q23 is connected with a capacitor 242 and with diodes 244 and 246. The capacitor 242 is connected with a conductor 248 which in turn is connected with junction 62 and the positive side of the regulated direct current source shown in FIG. 7. It will be appreciated from an inspection of FIG. 6 that the capacitor 242 can be charged from conductor 248, through capacitor 242, through diode 246, through resistor 249 and then through transistor Q23 providing this transistor is conductive. If transistor Q23 is nonconductive, there will be no charging circuit for the capacitor 242 and, as will become more readily apparent hereinafter, the conduction of transistor Q23 depends upon the level of current flowing through the shunt 18 and also upon the voltage generated by tachometer generator 32. This will provide both a torque limit and speed limit for the circuit as will be more fully described.

The charge curve for the capacitor 242 is a normal one in that it is fairly steep on the leading edge and then flattens off at the top. This means that the voltage at junction 252 between the diodes 244 and 246 is at a high voltage which is actually the regulated 14 volts on conductor 248.

It will be appreciated from an inspection of FIG. 6 that the junction 252 is coupled to the base of transistor Q1 shown in FIG. 5 through junction 160 and the conductor 254 shown in FIG. 6. It, therefore, will be appreciated that any time that the junction 160 is lowered in voltage the transistor Q1 (FIG. 5) will be biased to a conductive condition which will in turn bias the transistor Q2 conductive. If transistor Q2 turns on, it will connect a capacitor 256 shown in FIG. 5 in parallel with the capacitor 156 to thereby increase the time constant for the RC circuit that has previously been described and in effect increase the off time of the controlled rectifier 28. It now will be appreciated that when the transistor Q23 of FIG. 6 is biased on due to the development of a predetermined voltage across the shunt 18, the transistors Q1 and Q2 are turned on to therefore increase the off time of controlled rectifier 28.

The conduction of transistor Q23 is also controlled in response to the speed of rotation of the drive motor and should this speed exceed a predetermined value, the transistor Q23 will again be biased conductive and due to its connection with transistors Q1 and Q2 of FIG. 5 will cause the off time of the controlled rectifier 28 to be increased. It is seen in FIG. 6 that a voltage is developed across potentiometer resistor 260 connected with bridge rectifier 172 which will be a function of drive motor speed. The slider or wiper of potentiometer resistor 260 is connected with a diode 262 and with a Zener diode 264. When this voltage, between the slider of the potentiometer resistor 260 and conductor 174 exceeds some desired value, the Zener diode 264 will be biased conductive so that current will flow through the resistor 266 connected across the base and emitter of transistor Q23. This will turn on the transistor Q23 with the resultant turning on of transistors Q1 and Q2 shown in FIG. 5 which again increases the off time of controlled rectifier 28 to thereby decrease the speed of the propulsion motor 10 to the limiting value.

From the foregoing, it will be appreciated that both a torque limit and a speed limit circuit are provided with the motor control system of this invention and both of these systems operate through transistor Q23 shown in FIG. 6 to control a conduction of transistors Q1 and Q2.

The torque limit circuit as shown in FIG. 6 includes diodes D9 and D10 and a Zener diode Z3 connected in series with the emitter of transistor Q22. The diodes D9 and D10 and the Zener diode Z3 provide a regulated voltage which is floating at positive battery voltage. Since the shunt 18 is at the positive side of the entire motor system, the anode of Zener diode Z3 is at approximately 12 volts before positive battery voltage. The transistor Q22 has a capacitor 270 connected between its base and the conductor 274. A resistor 276 is connected across the base and collector of transistor Q22. With this arrangement, as battery voltage goes up, the voltage across transistor Q22 and the resistor 278 will increase and as battery voltage goes down this voltage will decrease. Transistor Q22 in addition to providing a voltage drop in the circuit also serves to filter out some of the spikes on the positive voltage due to switching of the controlled rectifier 28.

The motor control system of this invention includes an interlock circuit which prevents the operator from switching the vehicle to a reverse direction from a forward direction and vice-versa when the speed of the motor exceeds a predetermined value. This speed limit circuit includes the transistors Q11, Q12, and Q13 shown in FIG. 5 as well as a relay comprised of a relay coil 300 which operates movable contacts 302, 304 and 306. The movable contacts are shown in the position where the relay coil 300 is deenergized and when this relay coil is energized, the contacts are pulled out of engagement with the upper contacts and pulled into engagement with the lower contacts. It can be seen from FIG. 5 that the base of transistor Q11 is connected with conductor 182 and junction 180. This provides a voltage at the base of transistor Q11 which is a function of drive motor speed. It is also seen from an inspection of FIG. 5 that the collectors of transistors Q11 and Q12 are connected with a conductor 308 which in turn is connected to junction 54. Junction 54, as seen in FIG. 4, is connected with switch 38 and when the switch 38 is closed a positive voltage can be applied to the collectors of transistors Q11 and Q12. This means that when the accelerator pedal of a motor vehicle is depressed there is no positive voltage applied to the collectors of transistors Q11 and Q12 and as a result of this it is impossible for transistors Q11, Q12, and Q13 to conduct.

The speed signal which is applied to the base of transistor Q11 will operate to turn on the transistor Q11 when the tachometer generator 32 is developing a predetermined voltage. When transistor Q11 is biased conductive, the transistors Q12 and Q13 will be biased nonconductive. It is seen from an inspection of FIG. 5 that the circuit for the relay coil 300 is through the collector-emitter circuit of transistor Q13 to the lower potential conductor designated by reference numeral 310. Whenever relay coil 300 is energized a holding circuit is formed for this coil through conductor 312 and the lower contact 304A of relay operated switch 304. The circuit continues through conductor 314 and then through the collector-emitter circuit of transistor Q18 to conductor 310. Regardless of the mode of energization of relay coil 300, the positive voltage applied to this relay coil on conductor 316 must come through junction 58 which is connected with the fixed contacts of direction switch 86.

It will be appreciated that when the relay coil 300 is energized the movable contact 306 will engage the fixed contact 306A which completes a circuit to ground for junction 42 shown in FIG. 4 and therefore grounds one side of the erlay coils 68A, 70A, 72A and 74A. This ground circuit is from junction 42, through conductor 320, through movable contact 306 when it engages fixed contact 306A, and then to the grounded conductor 322. The interlock circuit shown in FIG. 5 further includes a transistor Q14 having its collector connected with fixed contact 302A. When the relay coil 300 is energized the movable contact 302 is pulled into engagement with fixed contact 302A and out of engagement with fixed contact 302B. When movable contact 302 engages fixed contact 302A the collector of transistor Q14 is connected with positive conductor 316. The base of transistor Q14 is connected in series with a diode 330 which in turn is connected to junction 116 shown in FIG. 4. The junction 116 is connected with the anode of the power controlled rectifier 28 and this voltage will therefore vary as the controlled rectifier 28 is turned on and off. Once the relay 300 is pulled in, the transistor Q14 will be biased conductive any time the anode of the main controlled rectifier 28 is at a positive voltage which is the condition you have whenever the main controlled rectifier 28 is turned off. This means that every time the main controlled rectifier 28 turn off, which raises the voltage of junction 116, the transistor Q14 will be biased conductive. When controlled rectifier 28 turns on transistor Q14 turns off and the capacitor 332 connected with the collector of transistor Q14 will be charged through the resistor 334 and closed contacts 302 and 302A.

From the foregoing, it will be appreciated that when controlled rectifier 28 is turned on the transistor Q14 is biased nonconductive and when controlled rectifier 28 is turned off the transistor Q14 is biased to conduct. This means that when transistor Q14 is conductive it will discharge the capacitor 332 but when it is biased nonconductive the capacitor 332 can charge through the resistor 334. The time that capacitor 332 charges is therefore determined by the period of time that the controlled rectifier 28 is conductive and if this controlled rectifier remains conductive for too long a period of time, the capacitor 332 will charge to such a value as to turn on the unijunction transistor Q15 having an emitter coupled to one end of the capacitor 332. When unijunction transistor Q15 turns on, it applies a firing pulse to the controlled rectifier Q16 connected across power lines 316 and 310. When controlled rectifier Q16 turns on, the junction 340 connected to the lower end of resistor 342 and to the anode of controlled rectifier Q16 through a diode will drop to substantially the potential of conductor 310. This will bias transistor Q17 nonconductive and since its collector is coupled to the base of transistor Q18 this transistor will be biased nonconductive. When transistor Q18 is biased to a nonconductive condition, it opens the holding circuit for relay coil 300 with the result that the contacts 302, 304, and 306 move to the position shown in FIG. 5.

The charge rate for the capacitor 332 is, of course, determined by the RC time constant of the circuit including the resistor 334 and the capacitor 332. The time of firing of the unijunction transistor Q15 is not, however, a straight line function of this RC time constant, but rather is also determined by the speed of rotation of the armature of the drive motor 12. This is accomplished by providing the circuit consisting of resistors 344, 346, 348 and 350 together with diodes D3 and D4. The resistors 344 and 346 are connected across lines 316 and 310 and the voltage applied to the anode of diode D4 is therefore a function of the potential appearing between the conductors 316 and 310. This same potential is utilized to charge the capacitor 332. On the other hand, the potential appearing at junction 352 is determined by the magnitude of the motor speed signal voltage applied to junction 180 and to resistor 350 through conductor 354. This potential will increase with increase in speed of the vehicle and speed of rotation of the armature of motor 12, and the net effect of this is that the voltage applied to diode D3 will eventually control the firing of unijunction transistor Q15 since the cathodes of diodes D3 and D4 are coupled to one of the base electrodes of the unijunction transistor as seen in FIG. 5. This means that the point of firing of unijunction transistor Q15 is varied as motor speed increases. This allows the controlled rectifier 28 to turn on for longer periods of time before the unijunction transistor Q15 is turned on. In other words at higher speeds of the motor 10 the controlled rectifier 28 can turn on for a longer period of time before any fault indication takes place.

As previously pointed out, when unijunction transistor Q15 does turn on, it starts a chain of events which biases transistor Q18 nonconductive. This opens the holding circuit for relay coil 300 with a result that the contacts 302, 304, and 306 move to their position shown in FIG. 5. When this happens the fault indicator light 120 will be energized through junctions 64 and 66 and through the closed contacts 302 and 302B of the relay.

To summarize the operation of the interlock circuit and fault circuit, it will be appreciated that when contact 306 is in the position shown in FIG. 5 the relay coils 68A, 70A, 72A, and 74A cannot be energized so that drive motor for the vehicle cannot be energized. In order to initially energize the relay coil 300 it is necessary that the forward-reverse switch designated by reference numerals 84 and 86 be moved to a forward or reverse position to apply a voltage to conductor 316 and that the switch 38 be closed to provide a potential for transistors Q11, Q12 and Q13 form conductro 308. Once these switches have been closed the relay coil 300 can be enenergized for initial starting of the drive motor of the vehicle and the relay coil 300 will then remain energized until a fault occurs which causes transistor Q18 to be biased to a nonconductive condition with a result the entire system must then be reset before the vehicle can be operated.

If the operator of the vehicle attempts to switch the vehicle from a forward mode of operation to a reverse mode of operation when the vehicle speed is above a predetermined value the control circuit will prevent a reversal of direction of the drive motor. Assuming that the direction switch is in the forward position with contacts 84A and 86A engaging the upper contacts (FIG. 4), the armature is rotated in a direction to provide a forward movement for the vehicle. If the operator now switches into reverse it is seen that contact 86A must now temporarily leave the upper fixed contact 86, shown in FIG. 4. This will temporarily deenergize relay coil 300 since the circuit to conductor 316 (FIG. 5) has been temporarily opened. The circuit to conductor 316 will be closed when contact 86A engages the lower contact of the direction switch but if the speed of the vehicle is now above a predetermined value transistor Q13 will be biased nonconductive due to the conduction of transistor Q11 by the voltage on line 182 to prevent the energization of coil 300. Even if the accelerator pedal is fully released when the attempted switching from forward to reverse takes place, so as to close switch 38, the relay coil 300 nevertheless can still not be energized if the vehicle is moving at a predetermined speed because at this time transistor Q11 will be biased to conduct with the result that transisor Q13 is biased nonconducive.

Figure 8:
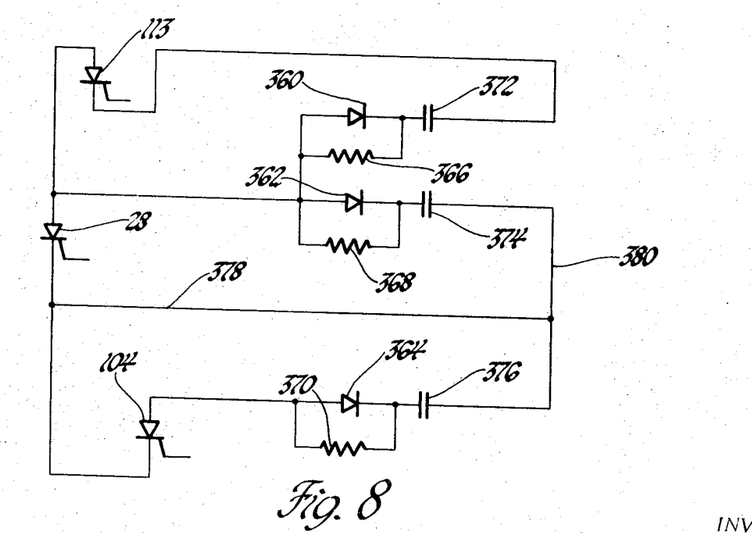
FIG. 8 is a schematic circuit diagram of a voltage protection circuit for some of the controlled rectifiers utilized in the power supply system of this invention.

Referring now more particularly to FIG. 8 a circuit for absorbing the voltage transients which are developed in the system for the controlled rectifiers as illustrated. This circuit as shown in FIG. 8 comprises diodes 360, 362, and 364. These diodes are shunted respectively by resistors 366, 368, and 370. The parallel diode and resistor circuits are connected in series respectively with capacitors 372, 374, and 376. These circuits are connected respectively to the controlled rectifiers in a manner illustrated in FIG. 8. It is seen that conductor 378 is connected with the cathode of the power controlled rectifier 28 and with conductor 380 which is connected to one side of capacitors 374 and 376. The purpose of the diode-resistor-capacitor circuits, shown in FIG. 8, is to provide $dv/dt$ protection for the controlled rectifiers and are known to those skilled in the art.

What is claimed is:

1. A motor control system comprising, a source of voltage, an electric motor, a switching device connected in series between said source of voltage and said motor, control means coupled to said switching device for alternately biasing said switching device conductive and nonconductive to thereby control the voltage applied to said motor from said source, means for developing a first signal which is a function of the time duration of conduction of said switching device, means for developing a second signal which is a function of motor speed, fault sensing means for sensing a fault condition wherein said switching device remains in a conductive condition for longer than a predetermined duration of time at a predetermined motor speed, and means coupling said first and second signals to said fault sensing means, said fault sensing means being energized when said first and second signals have predetermined magnitudes and permitting longer on time periods for said switching device as motor speed increases before said fault sensing means is energized.

2. The motor control system according to claim 1 wherein means are provided for disconnecting said source of voltage and said motor when said fault sensing means is energized.

3. A motor control system for a direct current motor comprising, a source of direct current, an electric motor, a switching device connected in series between said source of direct current and said electric motor, said switching device when conductive connecting said source of direct current and said electric motor and when nonconductive disconnecting said source of direct current and said electric motor, a control circuit coupled to said switching device including means for biasing said switching device on and off, said control circuit controlling the voltage applied to said motor, and a fault sensing circuit for sensing a condition wherein said switching device is maintained conductive for more than a predetermined duration of time for a given speed of said motor, said circuit including a capacitor connected across a source of direct current, a transistor connected in parallel with said capacitor, means coupled to said transistor and to said switching device for biasing said transistor on when said switching device is turned off, said last named means operative to bias said transistor off when said switching device is conductive, a switching circuit connected with said capacitor, and means for generating a voltage which is a function of motor speed connected to said switching circuit, said switching circuit being biased to a conductive condition in response to said capacitor attaining a predetermined charge and when said voltage has a predetermined magnitude.

4. A motor control system comprising, a source of voltage, an electric motor, a switching device connected between said source of voltage and said electric motor, means for biasing said switching device alternately conductive and nonconductive to thereby control the magnitude of the voltage applied to said motor, means for disconnecting said voltage source and said electric motor when said switching device remains conductive for greater than a predetermined length of time for a given motor speed, said last named means including a capacitor connected across a source of direct current, a transistor connected in parallel with said capacitor, means for biasing said transistor nonconductive when said switching device is conductive to thereby permit said capacitor to charge during the period of time that said switching device is conductive, means for generating a signal voltage which is a function of motor speed, and a control circuit responsive to the voltage across said capacitor and the magnitude of said signal voltage for causing said motor and said source of voltage to become disconnected when said switching device remains conductive for longer than a predetermined period of time for a given motor speed, said signal voltage operating to increase the voltage that must be attained by said capacitor to energize said control circuit.

5. An electric drive system for a vehicle comprising, a source of direct current, a direct current propulsion motor adapted to supply motive power to said vehicle, a controlled rectifier connected in series between said source of direct current and said motor, a control circuit connected to said controlled rectifier for biasing said controlled rectifier on and off, said control circuit including means for determining the respective on and off times of said controlled rectifier, means coupled to said control circuit for determining the on time of said controlled rectifier as a function of drive motor speed, said on time increasing as drive motor speed increases, said control circuit including an RC circuit comprised of a series connected variable resistor and first capacitor, means for adjusting said resistor to thereby control the RC time constant of said RC circuit, said RC circuit controlling the off time of said controlled rectifier and increasing said off time as said variable resistor is adjusted, a second capacitor, and means for connecting said second capacitor in parallel with said first capacitor to thereby increase the RC time constant of said RC circuit in response to the current supplied to said motor from said source of voltage exceeding a predetermined value.

6. The electric drive system according to claim 5 wherein said means for connecting said second capacitor in parallel with said first capacitor is also responsive to the speed of said motor attaining a predetermined value.

7. An electric drive system for a motor vehicle having at least one driving wheel comprising, a direct current motor coupled to said driving wheel, a source of direct current, a switching device connected between said source of direct current and said electric motor, said switching device being operated between conductive and nonconductive states to alternately connect and disconnect said source of direct current and said electric motor to thereby vary the voltage applied to said electric motor, a control circuit coupled to said switching device for determining the time duration of the on and off times of said switching device, means coupled to said electric motor and to said control circuit for varying the time duration of the on time of said switching device as a function of drive motor speed, said on time being increased as drive motor speed is increased, a manually operable device for controlling the speed of said vehicle, means coupling said manually operable device to said control circuit in such a manner that the off time of said switching device is decreased as said manually operable device in moved in one direction, and means coupled to said control circuit and responsive to motor current for increasing the off time of said switching device for a given motor speed when the current supplied to said electric motor from said source of direct current exceeds a predetermined limiting value.

8. An electric drive system for a motor vehicle having at least one drive wheel comprising, a direct current motor, a source of electrical power, a switching device connected between said source of power and said electric motor, said switching device operating between conductive and nonconductive states to alternately connect and disconnect said motor and said source of electrical power, a control circuit connected with said switching device for controlling the time duration of the on and off times of said switching device, means coupled to said control circuit for controlling the on time of said switching device as a function of drive motor speed, said last named means increasing the duration of the on time conduction periods of said switching device as motor speed increases, said control circuit including an RC timing circuit for controlling the duration of the off time periods of said switching device, said off time periods increasing as the RC time constant of said timing circuit is increased, said off time periods being determined in part by the capacitance of a first capacitor forming a part of said RC timing circuit, manually operable means for varying the time constant of said RC timing circuit, a second capacitor, and switching means for at times connecting said second capacitor in parallel with said first capacitor to increase the RC time constant of said RC timing circuit and thereby increase said off time periods of said switching device, said switching means including means responsive to the magnitude of current supplied to said motor reaching a predetermined value and to the speed of said motor attaining a predetermined value.

9. A propulsion system for a motor vehicle having at least one driving wheel comprising, a direct current motor coupled to said wheel, a source of direct current, a controlled rectifier connected between said source of direct current and said motor, means for biasing said controlled rectifier alternately conductive and nonconductive to thereby control the voltage applied to said motor from said source of direct current, fault sensing means for sensing a condition wherein said controlled rectifier remains in a conductive condition for a predetermined length of time at a predetermined motor speed, said fault sensing means including a voltage responsive trigger circuit, means for applying a first voltage to said trigger circuit which is a function of the time duration of conduction of said controlled rectifier, and means for applying a second voltage to said trigger circuit which is a function of motor speed, said second voltage increasing with increasing motor speed and operative to delay the triggering of said triggering circuit by said first voltage, said first voltage which is a function of the time duration of conduction of said controlled rectifier operating to trigger said trigger circuit at a predetermined speed of said motor.

10. An electric propulsion system for a motor vehicle comprising, a source of voltage, an electric drive motor, a switching device connected between said source of voltage and said drive motor, control circuit means connected with said switching device for biasing said switching device on and off and for determining respectively the on and off times of said switching device, a manually operable control device, an RC circuit including a variable resistor and a capacitor, means connecting said manually operable control device with said variable resistor whereby the RC time constant of said RC circuit is varied as said manually operable device is shifted, said RC circuit determining the off time of said switching device and operating to increase said off time as said variable resistor is adjusted to increase the RC time constant, means for controlling the on time of said switching device as a function of motor speed, and means for increasing the RC time constant of said RC circuit in response to motor current exceeding a predetermined value and in response to said motor speed exceeding a predetermined value.

11. An electric porpulsion system for a motor vehicle comprising, a source of electrical power, an electric drive motor for propelling said vehicle, a plurality of power directional control relays including switch contacts and relay coils, said switch contacts of said power directional control relays connected with said motor and with said source of power and operative to control the direction of rotation of said motor and the connection and disconnection of said source of power and said motor, a second relay including a relay coil and switch contacts, means connecting said switch contacts of said second relay in circuit with said relay coils of said power directional relays whereby said second relay controls the energization of said power directional relays, manually operable direction switches operable between forward and reverse positions connected respectively with said second relay coil and with said power directional relay coils, a transistor switching circuit including at least first and second transistors, said transistors connected such that when said first transistor is biased conductive said second transistor is biased nonconductive, means coupled to said motor for biasing said first transistor conductive when the speed of said motor exceeds a predetermined value to thereby bias said second transistor nonconductive, a first circuit for energizing said second relay coil including one of said manually operable direction switches, a second circuit for energizing a second relay coil including said second transistor, a manually operable accelerator pedal coulped to a control means which is operative to control the speed of said motor, a switching device connected with said accelerator pedal, said switching device being closed when said accelerator pedal is released and opened when said accelerator is depressed, and means connecting said switching device in circuit with said transistors, said system operating to prevent a reversal in the direction of rotation of said propulsion motor when said motor exceeds said predetermined speed.

References Cited
UNITED STATES PATENTS

| | | | |
|---|---|---|---|
| 3,332,507 | 7/1967 | Bush | 318—284X |
| 3,411,065 | 11/1968 | Tedd | 318—341 |
| 3,413,520 | 11/1968 | Westbrook | 317—13 |
| 3,427,506 | 2/1969 | Thiele | 318—341X |

ORIS L. RADER, Primary Examiner

R. J. HICKEY, Assistant Examiner

U.S. Cl. X.R.

318—284, 327, 341, 434; 317—13